(12) United States Patent
Namur

(10) Patent No.: US 7,722,766 B2
(45) Date of Patent: May 25, 2010

(54) FILTER CARTRIDGE INCLUDING A SNAP-ON RIM CONNECTOR

(75) Inventor: Marc Namur, Darmstadt (DE)

(73) Assignee: Brita GmbH, Taunusstein (DE)

( * ) Notice: Subject to any disclaimer, the term of this patent is extended or adjusted under 35 U.S.C. 154(b) by 475 days.

(21) Appl. No.: 11/665,392

(22) PCT Filed: Oct. 11, 2005

(86) PCT No.: PCT/EP2005/010914

§ 371 (c)(1),
(2), (4) Date: Apr. 13, 2007

(87) PCT Pub. No.: WO2006/040120

PCT Pub. Date: Apr. 20, 2006

(65) Prior Publication Data

US 2007/0289913 A1 Dec. 20, 2007

(30) Foreign Application Priority Data

Oct. 13, 2004 (DE) .................. 10 2004 049 877

(51) Int. Cl.
*B01D 35/027* (2006.01)
(52) U.S. Cl. .............. 210/232; 210/266; 210/282; 210/284; 210/286; 210/291; 210/172.3; 210/462; 210/482
(58) Field of Classification Search ............. 210/172.1, 210/172.3, 232, 266, 282, 284, 286, 291, 210/460, 462, 473, 477, 482
See application file for complete search history.

(56) References Cited

U.S. PATENT DOCUMENTS 1,195,427 A * 8/1916 Widner ................ 210/289
2,358,748 A * 9/1944 Thompson ............ 210/172.3
4,526,378 A * 7/1985 Fisher et al. ........... 277/617
4,948,505 A  8/1990 Petrucci et al.
5,336,406 A  8/1994 Stanford et al.
5,591,332 A  1/1997 Reid et al.
6,383,375 B1 * 5/2002 Zucholl ............... 210/172.2
2001/0009237 A1  7/2001 Chau

FOREIGN PATENT DOCUMENTS

DE   1 964 840        7/1970
DE   2 023 491 A1    12/1970
DE   G 92 07 977.6 U1  11/1992

(Continued)

*Primary Examiner*—Matthew O Savage
(74) *Attorney, Agent, or Firm*—Flaster/Greenberg PC

(57) ABSTRACT

The invention relates to a filter cartridge (1), especially a suction filter cartridge, which is provided, in the outlet opening (20), with an inward-pointing, peripheral snap-on rim (22) which can be folded from a first lower snap position into a second upper snap position and vice versa. The invention also relates to a seat element (30) for such a filter cartridge, comprising a connection sleeve (33) which engages with the outlet opening (20) of the filter cartridge (1). Said connecting sleeve (33) comprises at least one actuator which displaces, when the filter cartridge (1) is placed on the rim, the snap-on rim from a first lower snap position to the second upper snap-on rim from a first lower snap position to the second upper snap positioning which the snap-on rim rests against the connecting sleeve (33) in a sealing and clamping manner.

22 Claims, 7 Drawing Sheets

FOREIGN PATENT DOCUMENTS

| | | |
|---|---|---|
| DE | 37 80 990 T2 | 1/1993 |
| DE | 37 89 714 T2 | 8/1994 |
| DE | G 94 01 271.7 U1 | 5/1995 |
| DE | 196 48 405 A1 | 10/1998 |
| DE | 696 22 719 T2 | 4/2003 |
| EP | 0 844 339 A2 | 5/1998 |
| GB | 1 283 814 | 8/1972 |
| WO | WO 99/01220 A1 | 1/1999 |

* cited by examiner

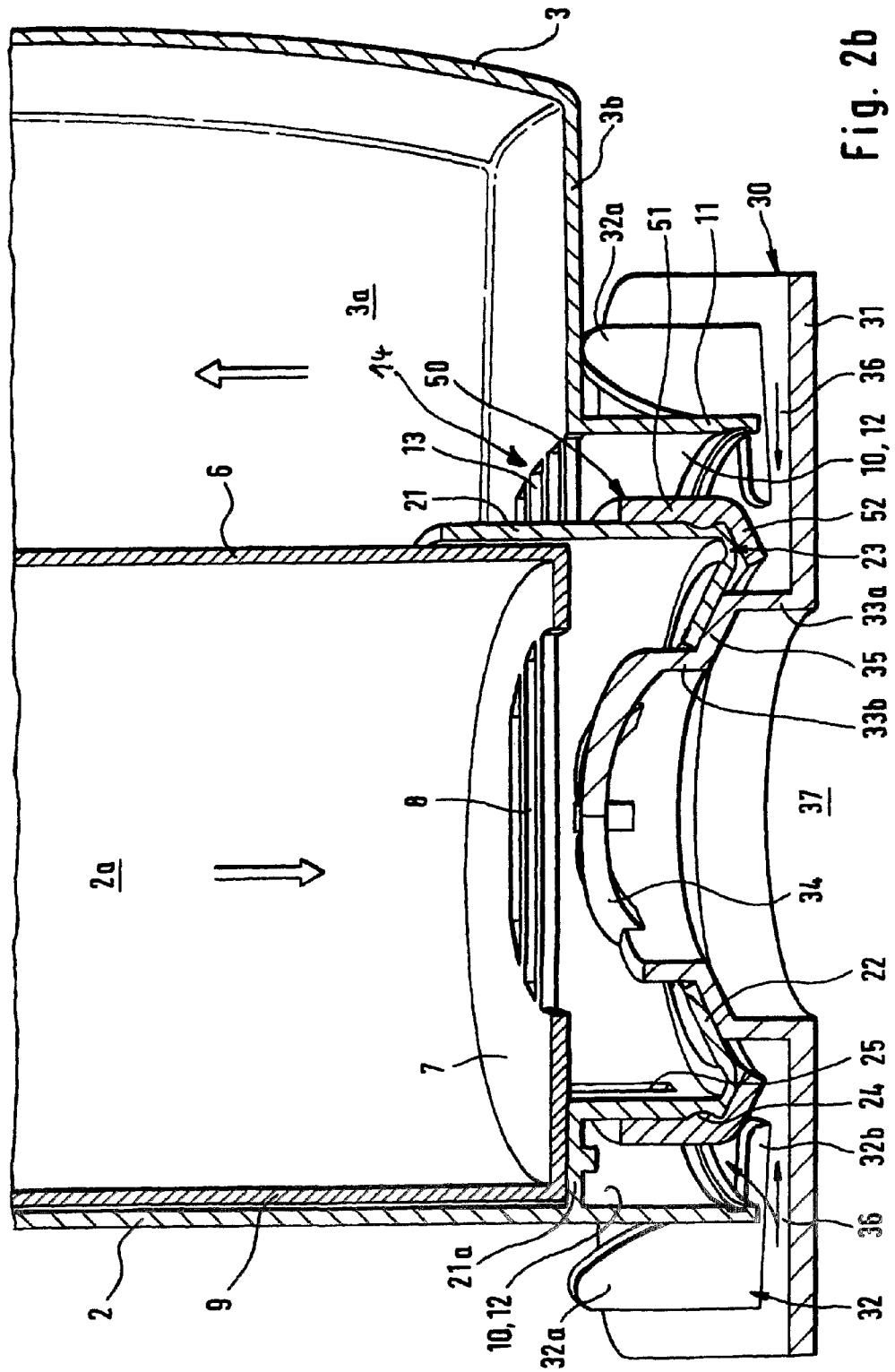

FILTER CARTRIDGE INCLUDING A SNAP-ON RIM CONNECTOR

BACKGROUND OF THE INVENTION

1. Field of the Invention

The invention relates to a filter cartridge, in particular a suction filter cartridge, according to the preamble of claim 1. The invention also comprises a seat element for such a filter cartridge. The inlet area and the outlet opening of the filter cartridge are arranged at the bottom area of the filter cartridge, which also includes a lateral inlet or outlet in a lower section of the inflow and outflow chamber adjacent to the bottom.

2. Description of Related Art

Suction filter cartridges are used in water vessels of automatic drink dispensers, e.g., for hot drinks, provided with a suction pump, such as e.g., coffee makers etc. The inlet and outlet openings of the suction filter cartridge are located in the bottom area of the otherwise completely enclosed cartridge housing. A seat element is arranged in the water vessel of the device, adjusted to the outlet opening, which may be a separate component or be formed at a water vessel. This seat element has an outlet opening as well, through which the filtered water can flow out of the water vessel. The seat element serves to accept the suction filter cartridge inserted into this seat element.

Due to the fact that the outlet opening of the water vessel is connected to the suction pump of the device, the water to be filtered is suctioned out of the water vessel, passes the filter medium or filter media in the cartridge, and reaches the outlet opening in a filtered state.

Due to the fact that the suction filter cartridge is arranged inside the water vessel of the device the filter cartridge floats when the water vessel is filled. In order to prevent floating and thus a separation of the filter cartridge from the outlet opening of the seat element of the water vessel special fastening means are provided. According to a known solution the suction filter cartridge is screwed onto the seat element. Here it is disadvantageous that suction filter cartridges with an asymmetrical filter housing cannot be screwed into narrow water vessels. Additionally, in deep and narrow water vessels tools are necessary to screw in the cartridge.

Another resolution provides for the suction filter cartridge to be placed onto the seat element and to turn over a clamping element after the insertion in order to fix the suction filter cartridge in its position.

From WO 99/01220 a suction filter cartridge is known, in which the water inlet opening is arranged at the bottom and a pass for water through the filter media is provided in the up-current. Furthermore, a downspout is provided for guiding the water downwards to an extraction connector of the water vessel located at the bottom. Here, the mixture of filter means comprising activated carbon and ion exchangers are floated during operation, counteracting any compression of the filter bed.

The downspout is arranged centrally inside the suction filter cartridge, so that the bottom connector of the suction filter cartridge can also occur centrally. Here, the inlet opening is arranged circularly in the suction filter cartridge.

An axial closing element is necessary to seal the outlet channel from the inlet channel.

The suction filter cartridge comprises at its bottom fixing elements, by which it can be connected to a seat element. Additionally it is necessary, though, that the suction filter cartridge is supported on the lid of the water vessel in order to prevent floating of the suction filter cartridge in a filled water vessel. Here, it may be necessary in deep water vessels to extend the suction filter cartridge at the top, e.g. by a rod.

Such additional securing elements are frequently not arranged correctly, thus the tight seat on the seat element is not ensured.

BRIEF SUMMARY OF THE INVENTION

Therefore, the object of the invention is to provide a filter cartridge, in particular a suction filter cartridge, which goes without any additional securing elements, can be inserted in a simple manner, and ensures a reliable seal in the area of the outlet opening.

This object is attained in a filter cartridge, in which a snap-on rim is provided in the outlet opening, pointing inwardly, which can be turned down from a first lower snap position into an upper second snap position and vice versa.

The corresponding seat element is characterized by a connecting sleeve engaging the outlet opening of the filter cartridge, having at least one actuator, which moves the snap-on rim from the first lower snap position into the second upper snap position when placed onto the filter cartridge, in which the snap-on rim contacts the connecting sleeve in a sealing and clamping manner.

Preferably the actuator is a circular shoulder arranged at the connecting sleeve.

The filter cartridge with the snap-on rim situated in the lower snap position is placed onto the seat element from the top and pressed downward until the snap-on rim turns upwards and hereby engages the connecting sleeve of the seat element. The seat element is adjusted to the snap-on rim such that with a turned-over snap-on rim the filter cartridge contacts the connecting sleeve in a sealing manner and is fixed. The turn-over signals to the operator that the filter cartridge has taken its predetermined sealing position. This prevents a faulty positioning by the operator.

In order to remove the filter cartridge it is only pulled out upwards, which turns the snap-on rim back into its lower snap position.

Preferably the outlet opening is provided with an outlet sleeve, with a snap-on rim being linked to its lower end. The snap-on rim may be linked via a film link.

The snap-on rim is preferably a flat edge strip extending radially inward.

The edge strip is preferably embodied as a ring.

The snap-on rim settles in two stable positions, namely a lower position and an upper one. The intermediate position of the snap-on rim is an unstable position, from which based on its tension it automatically turns into one or the other position. The snap-on rim advantageously comprises an elastic plastic.

By the turn-over process of the snap-on rim radial forces act upon the outlet sleeve, which may lead to a widening and perhaps to a reduction of the clamping forces in the upper second snap position. Therefore, it is advantageous for the outlet sleeve to be surrounded by a circular stabilizer.

Advantageously the circular stabilizer is provided with an angled collar protruding into the outlet opening, which the snap-on rim contacts in the first lower snap position. This ensures a defined original position for the snap-on rim.

Preferably the circular stabilizer is arranged rotary at the outlet sleeve. The rotation of the circular stabilizer allows to provide an bypass adjustable in its cross-section, which connects the inlet area to the outlet opening.

The adjustable bypass is preferably sized such that not the entire crude water immediately flows from the inlet opening into the outlet opening. Preferably the bypass is designed such that no more than 50% of the crude water can be diverted to the outlet opening.

In particular, this is possible when the inlet area of the filter cartridge surrounds the outlet sleeve in a circular fashion.

According to a first variant the outlet sleeve is provided with at least one first opening. The circular stabilizer is provided with a cylindrical section contacting the outlet sleeve, at which preferably a closing element or in which preferably at least one second opening is provided, which can be aligned to the first opening. In this case the first and second opening(s) combined form the bypass opening(s).

By rotating the circular stabilizer the cross-section of the first opening of the outlet sleeve can be adjusted such that the added amount of the untreated crude water can be added to the water treated by the filter means in the filter cartridge, adjusted in a controlled manner. Using such a bypass the performance of the filter cartridge can be adjusted to the water quality such that the water best for the aroma and best for the automatic drink dispensers can be provided. Depending on the water quality found on the location of the automatic drink dispensers and the selected coffee brand entirely decarbonized water may not be optimal for the development of the aroma, and even the machine parts may be damaged. When decarbonization is not adjusted, in the worst case scenario, corrosion of the metal components may develop. Then the consequences are high maintenance and repair costs.

Additionally, the integrated bypass increases the capacity of the filter cartridge. When based on the water quality less performance is necessary, it is adjustable and the filter cartridge softens to the same level for a longer period of time.

Preferably the second opening of the circular stabilizer has a size that is greater than or equal to a size of the first opening of the outlet sleeve.

The circular stabilizer preferably contacts the outlet sleeve in a sealing manner. This prevents that in closed first openings unintentionally crude water can enter the outlet opening, in particular through the second openings of the circular stabilizer between the circular stabilizer and the outlet sleeve.

A second variant provides at least one bypass opening in the bottom wall of the outflow chamber. The bypass opening is preferably closed by a closing element arranged at the circular stabilizer, with the crude water amounts flowing through the bypass opening can be adjusted by way of rotating the circular stabilizers.

The closing element may be an arc-shaped collar arranged at a circular stabilizer, which preferably contacts the underside of the bottom wall of the outflow chamber in a sealing manner.

Instead of a closing element, similar to the first variant, the collar may be provided with one or more second opening(s), which can be aligned to the opening(s) in the bottom wall of the outflow chamber.

Different from the first variant, the crude water does not reach the outlet sleeve immediately, rather it is guided into the interior of the outflow chamber, allowing this crude water also to be filtered.

The extent crude water is guided into the interior chamber of the outflow chamber can be defined by the length of the riser surrounding a bypass opening. The lower section of the outflow chamber is therefore jointly used by the already filtered water and by the crude water introduced via the bypass opening.

The jointly used area may be provided with a fill of activated carbon for dechlorinizing the bypass water. Depending on the type and form of the fill material a separating layer may be provided on the fill, comprising a fleece, for example, in order to prevent any mixing with the filter means, arranged perhaps thereabove, e.g., made from an ion exchanging material.

This jointly used area inside the down-current chamber may also be separated by an intermediate floor not penetrable by liquids. In the chamber formed between the bottom and the intermediate floor a filter medium may be arranged, particularly an activated carbon fleece.

Both the up-current chamber as well as the down-current chamber may be provided with at least one filter means. It has shown advantageous for the up-current chamber to be provided with an fluidized bed and the down-current chamber with a packed bed. The advantage of the equipment of both filter chambers with filter means lies the fact that the risers and/or downspouts of prior art, extending over the entire height of the suction filter cartridge, can be omitted. The fluidized bed in the up-current chamber causes only a slight loss of pressure.

Advantageously the outlet sleeve and/or the circular stabilizer, are provided, preferably below the first opening, with at least one sealing bead extending around the perimeter such that any unintended bypass is prevented.

In a simple embodiment the seat element may be provided with a base plate, at which the connecting sleeve is arranged.

At least one spacer is arranged on the base plate in order to allow or to facilitate the inflow of crude water into the filter cartridge. When inserting the filter cartridge it rests to the spacer.

Furthermore, at least one positioning element may be provided on the base plate in order to facilitate the insertion of the filter cartridge on the seat element.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the following, exemplary embodiments of the invention are explained in greater detail using the drawings. A suction filter cartridge is described as an example for the filter cartridge according to the invention. It is shown.

DETAILED DESCRIPTION OF THE INVENTION

Figure 1:
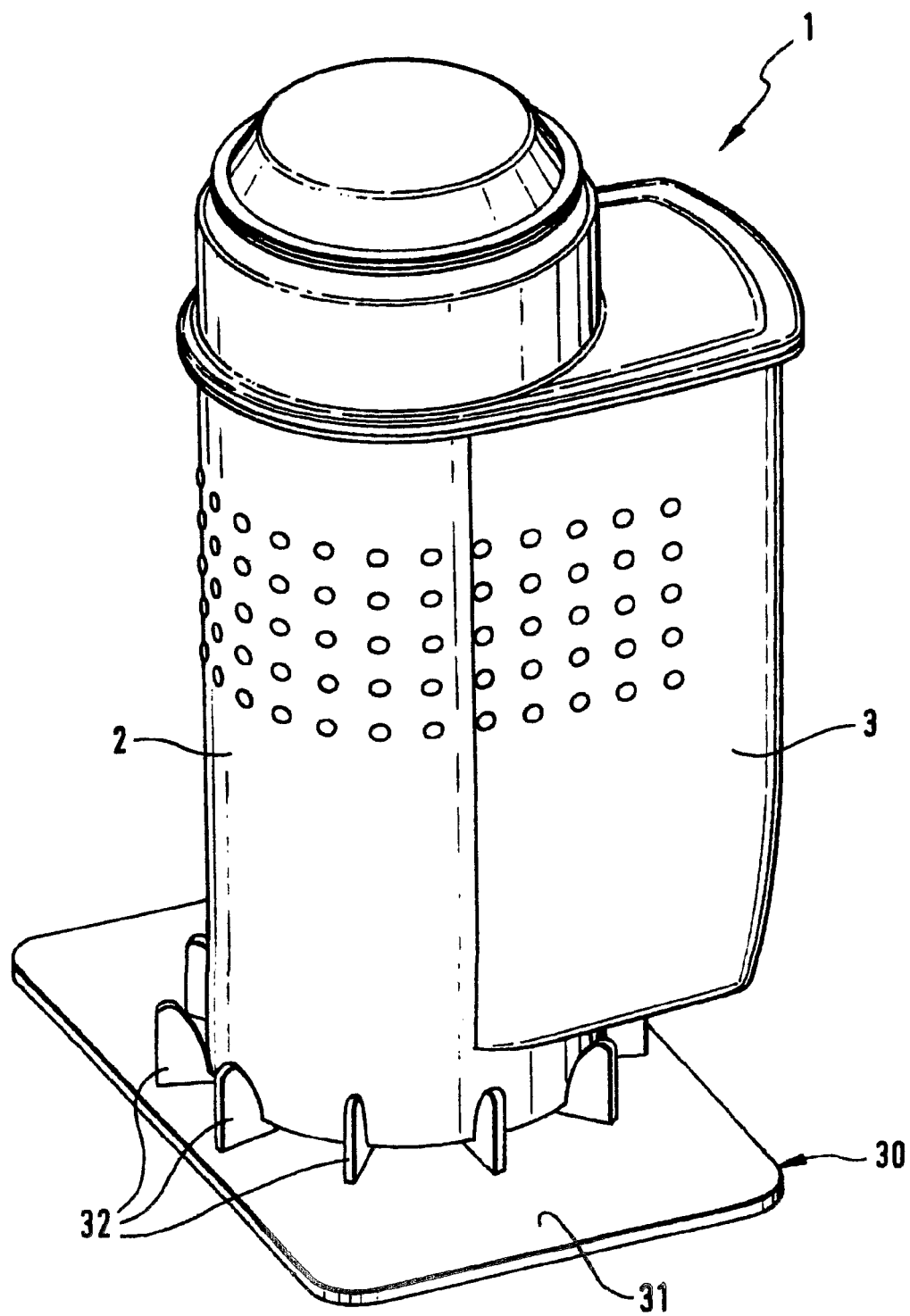
FIG. 1 a perspective view of a suction filter cartridge having an attached seat element, FIG. 2a a vertical cross-section through FIG. 1 showing a filter cartridge with an attached seat element, FIG. 2b an enlarged representation of the outlet area of the suction filter cartridge shown in FIG. 2a, FIG. 3 a vertical cross-section through the suction filter cartridge shown in FIGS. 1 and 2a, b, without a seat element, FIG. 4 an enlarged perspective representation of the lower section of the suction filter cartridge shown in FIGS. 1 through 3, partially in a cross-section, FIG. 5 a perspective top onto of seat element shown in FIGS. 1 and 2a, b, FIG. 6 an enlarged cross-section of the lower area of the suction filter cartridge according to another embodiment, FIG. 7 a perspective bottom view to the outlet opening of the suction filter cartridge.

In FIG. 1 a suction filter cartridge 1 is shown in a side view. The suction filter cartridge 1 has a central housing part 2, which has the down-current chamber 2a, and a housing part 3 laterally mounted to the housing part 2. The off-set arrangement of the housing parts 2 and 3 serves the purpose that the up-current and down-current chambers can be embodied with a large volume at a narrow width of the water vessel.

The suction filter cartridge 1 is supported on a seat element 30, which is located in or at the outlet opening of the water vessel (not shown). The suction pump, not shown either, is connected to the outlet opening. During operation water is suctioned out of the water vessel into the suction filter cartridge 1 and removed through the outlet opening. The seat element 30 may also be an integral component of the water vessel. The seat element 30 has a base plate 31, on which position elements 32 are arranged in an annular manner, which will be described in greater detail in the following.

Figure 2A:
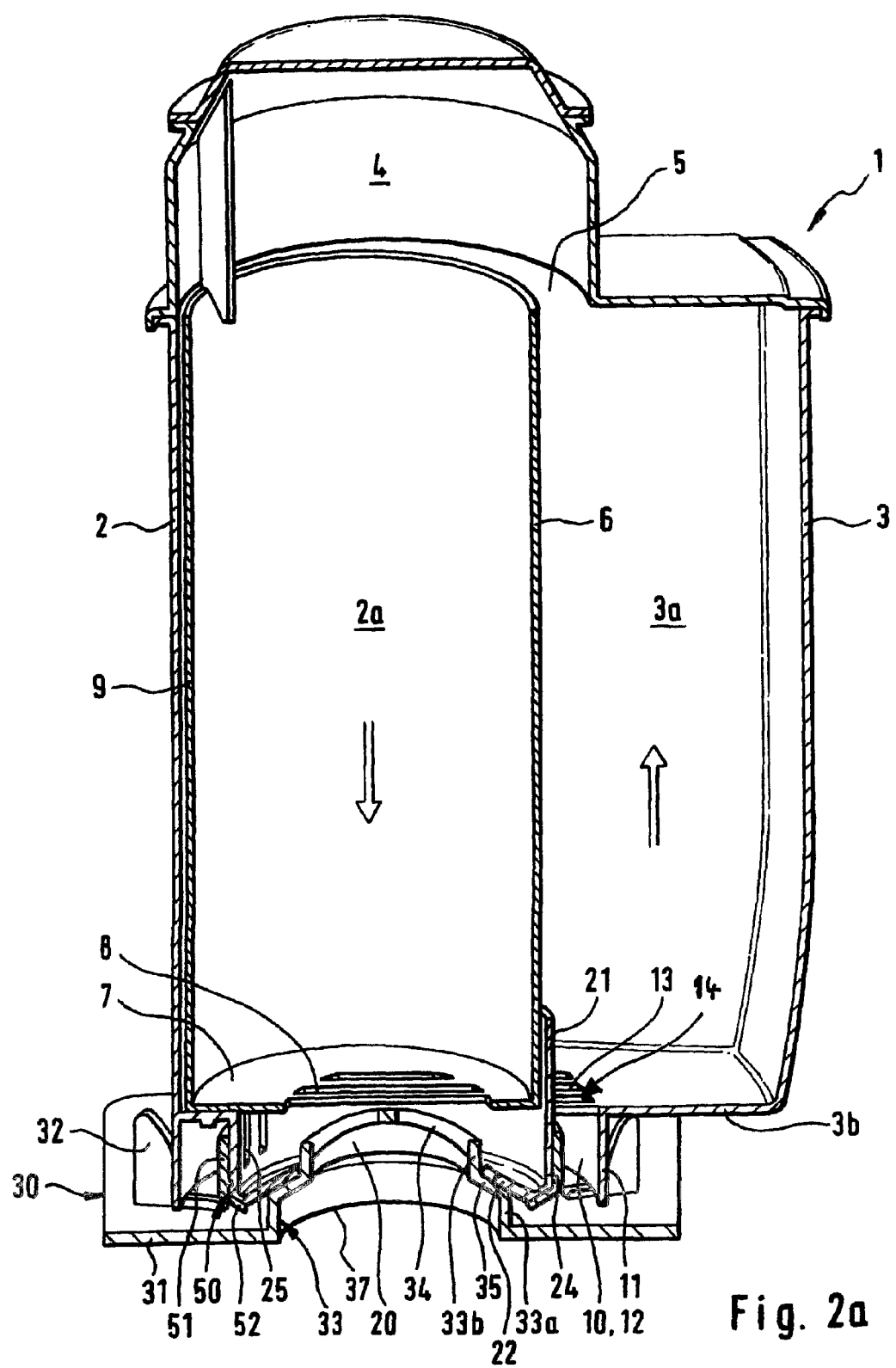

FIG. 2a, b show a vertical cross-section through the suction filter cartridge 1 with an attached seat element 30. In the central housing part 2 there is a down-current chamber 2a, which may be filled with a packed bed made from a filter material. An up-current chamber 3a is located in the attached housing part 3 with the bottom wall 3b, which may comprise a fluidized bed made from a filter material. This up-current chamber 3a is separated by a vertically arranged separating wall 6 from the down-current chamber 2a. In the embodiment shown here the separating wall 6 is a component of the circumferential wall of the down-current insert 9, which is additionally provided with a bottom wall 7 with a centrally arranged floor grid 8. Both chambers 2a, 3a are connected to a connection opening 5 via a connection chamber 4 arranged in the upper area of the suction filter cartridge 1.

The inlet area 10 is arranged in the lower section of the suction filter cartridge 1, embodied as a circular channel 12. Said circular channel 12 is formed by a circular wall 11, protruding downwards from the central and attached housing 2, 3, and an outlet sleeve 21 surrounding the outlet opening 20 of the down-current chamber 2a. The circular chamber 12 mouths in empties into the up-current chamber 3a via a grid 13 in the bottom wall 3b. The grid 13 is provided with the inlet openings 14.

The outlet sleeve 21 is provided with first openings 25, connecting the inlet area 10 and/or the circular channel 12 with the outlet opening 20. This represents slot-shaped openings 25, arranged distributed over a section of the perimeter of the outlet sleeve 21. At the lower end of the outlet sleeve 21a closed circular snap-on rim 22 is linked via a film link 23, which protrudes radially inward into the outlet opening 20. At the exterior wall of the outlet sleeve 21 a circular stabilizer 50 is arranged, having a cylindrical section 51 and a collar 52, inclined at an angle towards the inside. In the cylindrical section 51 second openings 53 are arranged (also see FIG. 4), which can be aligned by rotating the circular stabilizer 50 to the first openings 25. The first and second openings 25, 53 together form the bypass openings.

The seat element 30 is provided with a connecting sleeve 33 surrounding its outlet opening 37, comprising a lower section 33a and a section 33b with its diameter being reduced. A circular shoulder 35, pointing upwards in an inclined fashion, is arranged between the two sections 33a, 33b, forming the actuator for the snap-on rim 22. Bars 34 span over the outlet opening 37 at the upper section 33b.

When placing the suction filter cartridge 1 onto the seat element 30 the snap-on rim 22 is grasped by the circular shoulder 35 and turned upward into the second snap position, in which it contacts the section 33b of the connecting sleeve 33 in a sealing and clamping manner, thus fixing the suction filter cartridge 1. The exterior diameter of section 33b is slightly larger than the interior diameter of the snap-on rim 22 in its second snap position, in order for the desired clamping forces to develop. Additional closing elements are unnecessary.

When the water vessel is filled and/or the suction pump is switched off the suction filter cartridge cannot float. Additional fixing or fastening means for the suction filter cartridge 1 are therefore not necessary.

The seat element 30 is provided with positioning elements 32, comprising the towering centering elements 32a and the spacers 32b. The circular wall 11 of the suction filter cartridge 1 is supported on the spacers so that crude water can flow into the suction filter cartridge 1 through the intermediate space between the base plate 31 and the circular wall 11. This way, inlet channels 36 are formed (see FIG. 2b) between the positioning elements 32.

Figure 3:
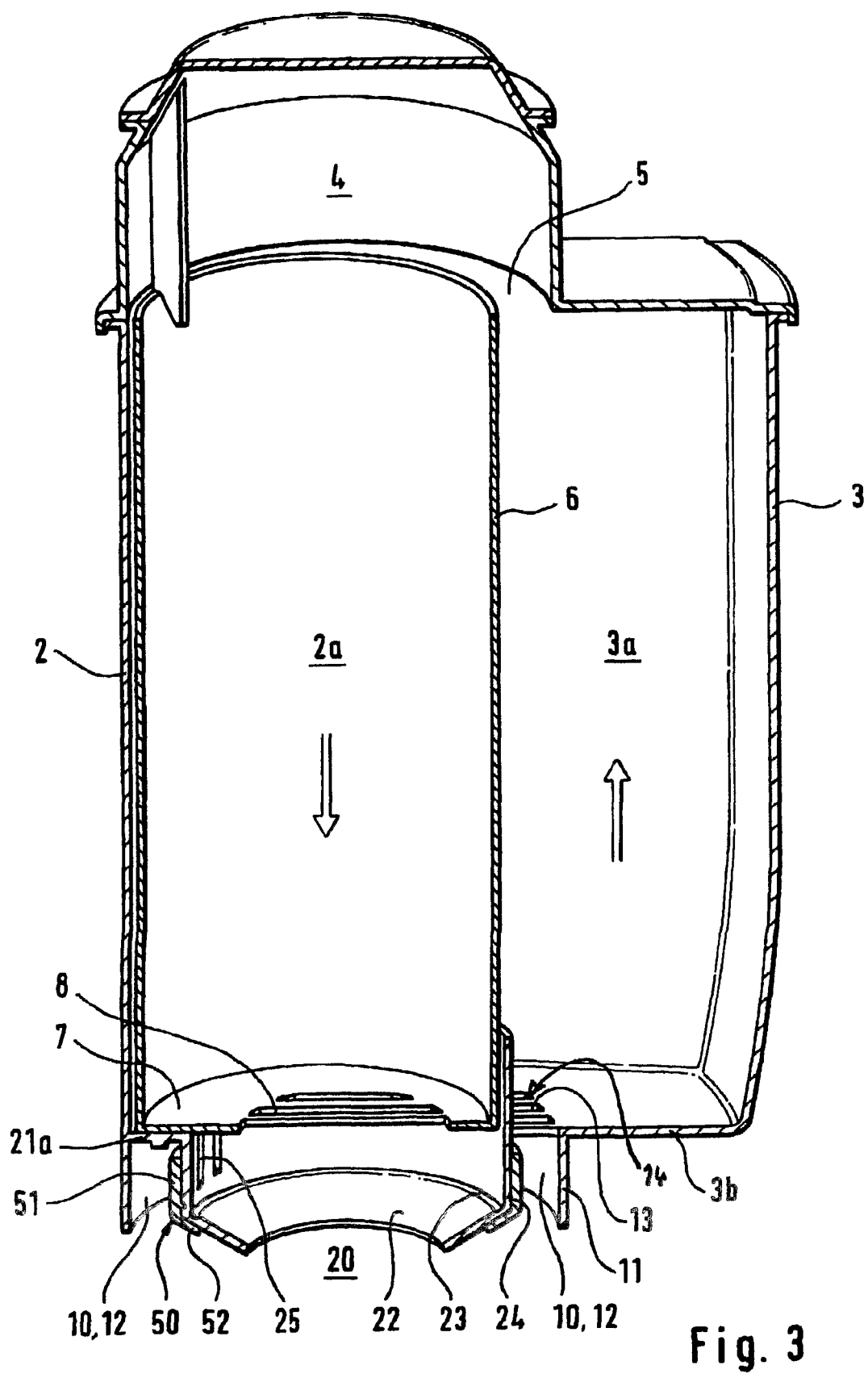

In FIG. 3 the suction filter cartridge 1 is shown with the snap-on rim 22 in its lower snap position, in which the snap-on rim 22 is supported on the collar 52 of the circular stabilizer 50. In order to seal the gap between the circular stabilizer 50 and the outlet sleeve 21 the circular stabilizer 50 is provided with an encircling sealing bead 24 at the cylindrical section 51.

Figure 4:
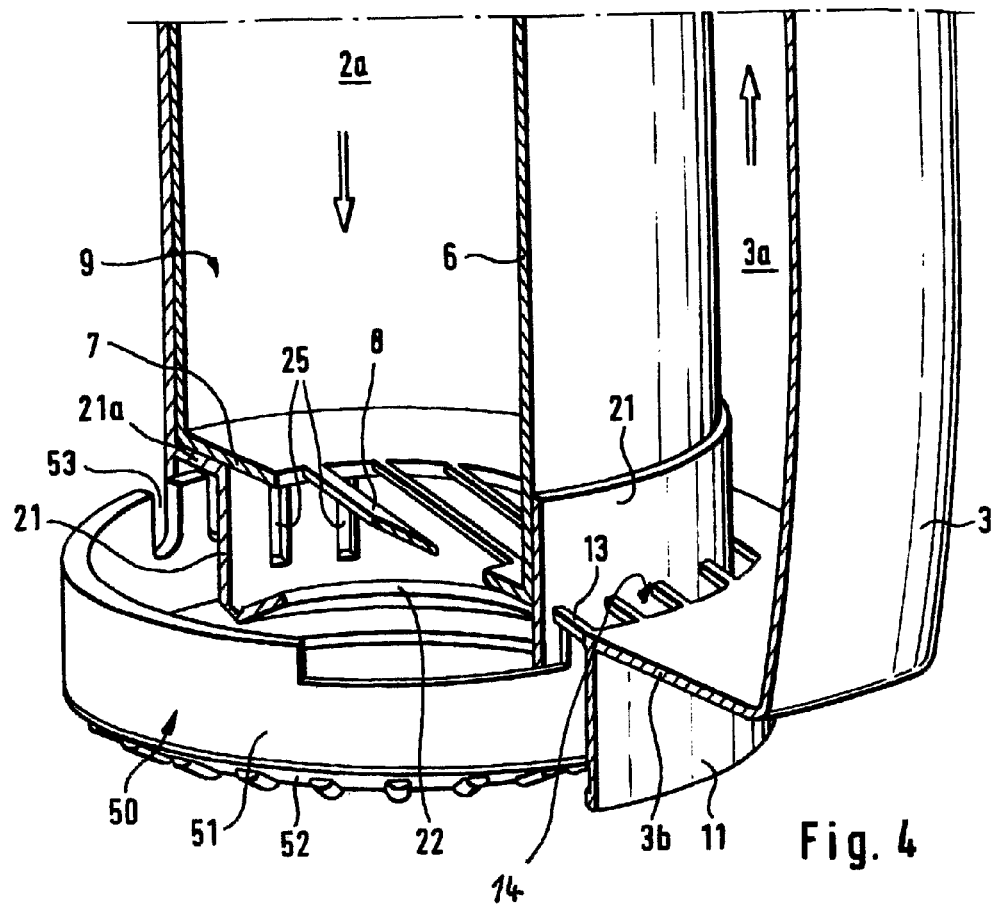

In FIG. 4 the lower section of the suction filter cartridge 1 is shown enlarged and in a perspective. The rotary circular stabilizer 50 is provided with second openings 53, which are located opposite to the first openings 25. By rotating the circular stabilizer 50 these second openings 53 can be aligned to the first openings 25. Depending on the level of overlapping of the openings 25, 53 more or less crude water can be guided from the inlet area 10 directly into the outlet opening 20.

Figure 5:
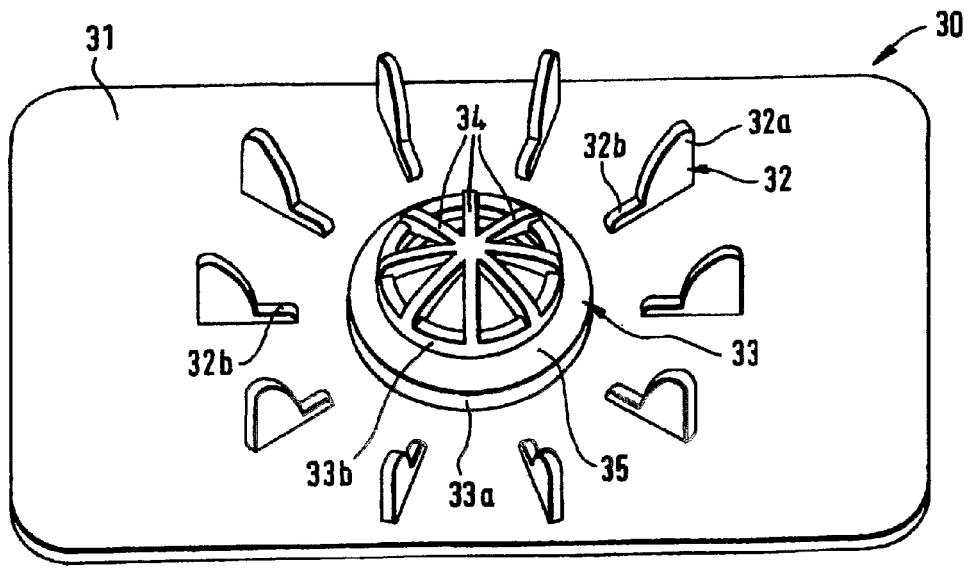

The seat element 30 is shown in a perspective in FIG. 5. It is discernible that the connecting sleeve 33 is surrounded by an annulus of positioning elements 32.

Figure 6:
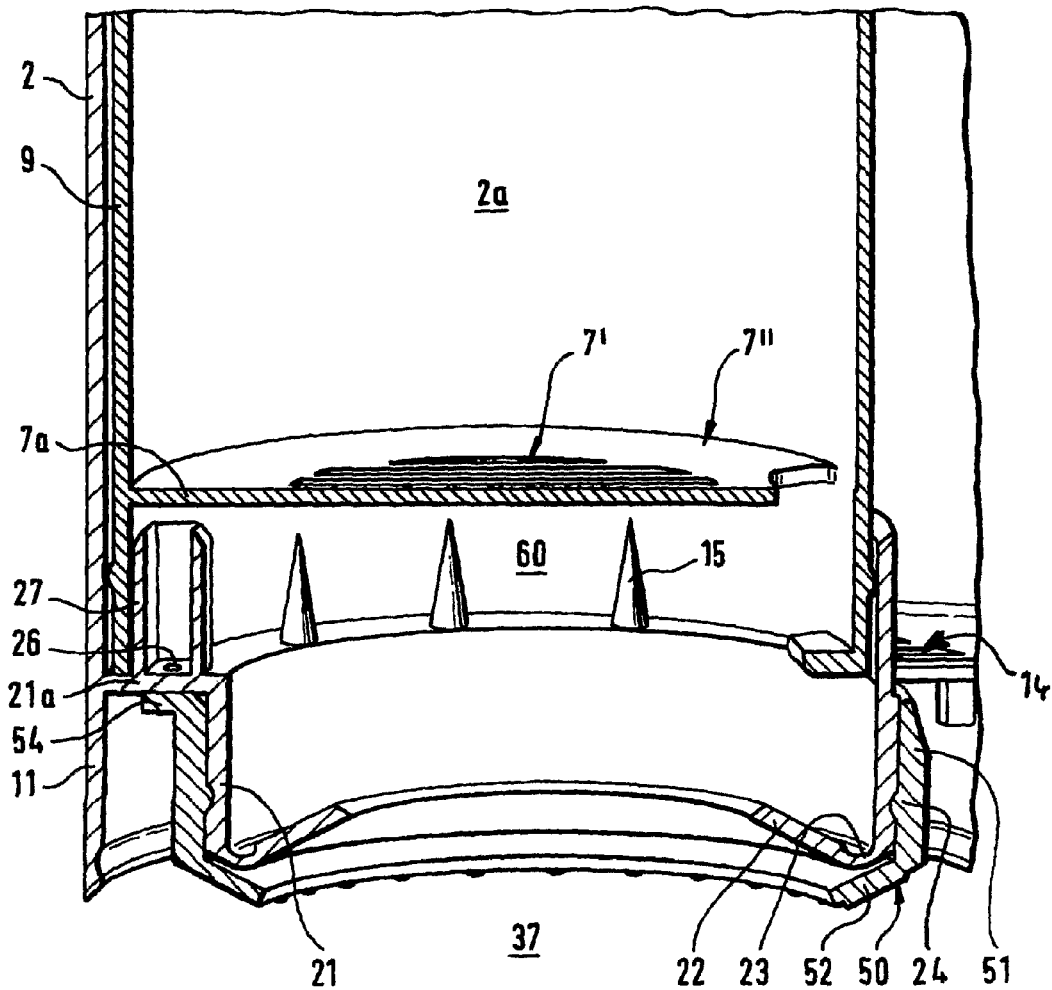

FIG. 6 shows the lower section of a suction filter cartridge 1 according to another exemplary embodiment relating to the bypass openings. Differently from the previously described embodiments, here at least one bypass opening 26, preferably embodied as bores in the bottom wall 21a, connect the outlet sleeve 21 with the circular wall 11. This bottom wall 21a is also shown in FIGS. 2a, 2b, 3, and 4, with the bottom wall 7 of the down-current insert 9 resting on said bottom wall 21a. In the embodiment shown in FIG. 6 the bottom wall 7 is omitted so that the bottom wall 21a closes the down-current chamber 2a at the bottom. The crude water flowing into the circular channel 12 through the bypass openings 26, with in FIG. 6 only one bypass opening 26 being shown, is not guided immediately into the outlet opening 37 but into the interior of the down-current chamber 2a, provided at a distance from the bottom wall 21a with an intermediate floor 7a permeable by liquids. The permeability of the intermediate floor 7a is limited to a central area 7'. By said intermediate floor 7a another chamber 60 is separated in the lower section of the down-current chamber 2a. Inside said chamber 60 risers 27 are arranged bypassing the bypass openings 26. The crude water is guided upwards through these risers 27 and deflected by the not permeably circular area 7" of the intermediate floor 7a. In chamber 60 a filter material may be arranged, for example a fleece, which is held by needles 15.

In order to close and/or release the bypass openings 26, the circular stabilizer 50 is provided with a closing element 54 at the upper edge, which is formed to the circular stabilizer 50. In order to prevent unintentional bypassing this closing element 54 contacts the underside of the bottom wall 21*a* in a sealing manner. The closing element 54 comprises an arc-shaped collar, as discernible from FIG. 7. By rotating the circular stabilizers 50 the bypass openings 26 may be released or closed.

Figure 7:
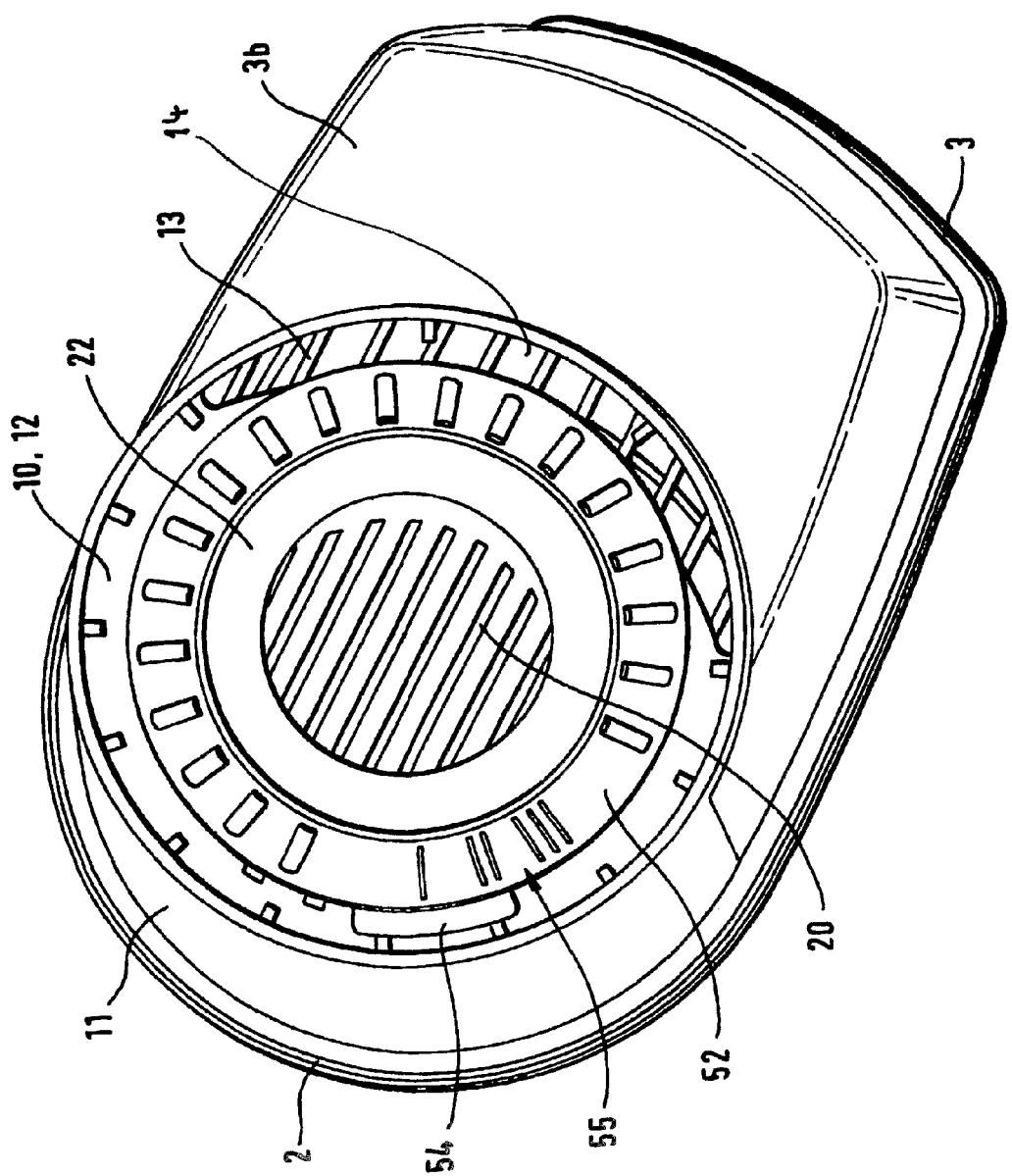

In FIG. 7 a perspective bottom view to the outlet opening 20 of the suction filter cartridge 1 is shown. The collar 52 is provided with markings 55 showing the operator the present position of the circular stabilizer 50. The circular stabilizer 50 may be rotated by the operator via corrugation, so that he/she can adjust the desired amount of liquids that shall be deflected into the outlet opening 20. Additionally the closing element 54 is shown as an arc-shaped collar of the circular stabilizer 50.

LIST OF REFERENCE CHARACTERS

1 Suction filter cartridge
2 Central housing part
2*a* Down-current chamber
3 Attached housing part
3*a* Up-current chamber
3*b* Bottom wall
4 Connecting chamber
5 Connecting openings
6 Separating wall
7 Bottom wall
7' Permeable section
7" Impermeable section
7*a* Intermediate floor
8 Bottom grid
9 Down-current insert
10 Inlet area
11 Circular wall
12 Circular channel
13 Grid
14 Inlet opening
15 Needles
20 Outlet opening
21*a* Bottom wall
21 Outlet sleeve
22 snap-on rim
23 Film link
24 Sealing bead
25 First opening
26 Bypass opening
27 Riser
30 Seat element
31 Base plate
32 Positioning element
32*a* Centering element
32*b* Spacers
33 Connecting sleeve
33*a* Lower section
33*b* Upper section
34 Bar
35 Circular shoulder
36 Inlet channel
37 Outlet opening
50 Circular stabilizer
51 Cylindrical section
52 Collar
53 Second openings
54 Closing element
55 Marking
60 Chamber It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A filter cartridge (1), in particular a suction filter cartridge, having filter means with at least one up-current chamber (3*a*) and at least one down-current chamber (2*a*), connected to each other in the upper section, and having at least one inlet area (10) upstream of an inlet opening (14) and with an outlet opening (20), both of which being arranged in the bottom area, characterized in that an encircling snap-on rim (22) pointing inwardly is provided in the outlet opening (20), which can be turned over from a first lower snap position into an upper second snap position.

2. A filter cartridge (1) according to claim 1, characterized in that the outlet opening (20) is provided with an outlet sleeve (21) having the snap-on rim (22) being linked at its lower end.

3. A filter cartridge (1) according to claim 2, characterized in that the snap on rim (22) is linked via a film link (23).

4. A filter cartridge (1) according to claim 2, characterized in that the outlet sleeve (21) is surrounded by a circular stabilizer (50) at its exterior.

5. A filter cartridge (1) according to claim 4, characterized in that the circular stabilizer (5) is provided with an angled collar (52) protruding into the outlet opening (20), at which the snap-on rim (22) contacts in its first lower snap position.

6. A filter cartridge (1) according to claim 4, characterized in that the circular stabilizer (50) is arranged at the outlet sleeve (21) in a rotary fashion.

7. A filter cartridge (1) according to claim 4, characterized in that the circular stabilizer (50) contacts the outlet sleeve (21) in a sealing manner.

8. A filter cartridge (1) according to claim 2, characterized in that the inlet area (10) surrounds the outlet sleeve (21) in a circular manner.

9. A filter cartridge (1) according to claim 2, characterized in that the outlet sleeve (21) is at least provided with a first opening (25).

10. A filter cartridge (1) according to claim 9, characterized in that the circular stabilizer (50) is provided with a cylindrical section (51) contacting the outlet sleeve (21), at which a closing element (54) or in which at least one second opening (53) is located that can be aligned to the first openings (25).

11. A filter cartridge (1) according to claim 10, characterized in that the second opening (53) of the circular stabilizer (50) has a size that is greater than or equal to a size of the first opening (25) of the outlet sleeve (21).

12. A filter cartridge according to claim 2, characterized in that the outlet sleeve (21) and/or the circular stabilizer (50) are at least provided with one sealing bead (24) extending around its perimeter.

13. A filter cartridge (1) according to claim 1, characterized in that the snap-on rim (22) is a flat edge strip extending radially inward.

14. A filter cartridge according to claim 1, characterized in that at least one bypass opening (26) is arranged in the bottom wall (7, 21*a*) of the down-current chamber (2*a*).

15. A filter cartridge according to claim 14, characterized in that a riser (27) is arranged in the down-current chamber (2*a*) surrounding the bypass opening (26).

16. A filter cartridge according to claim 14, characterized in that the outlet sleeve (21) is surrounded by a circular stabilizer (50) at its exterior and the circular stabilizer (50) is provided with a closing element (54) contacting the underside of the bottom wall (7, 21*a*).

17. A filter cartridge according to claim 16, characterized in that the closing element (54) is an arc-shaped collar.

18. A filter cartridge according to claim 1, characterized in that the down-current chamber (2*a*) is provided with an intermediate floor (7*a*) that is liquid permeable.

19. A filter cartridge according to claim 18, characterized in that a chamber (60) is formed between the bottom wall (7, 21*a*) and the intermediate floor (7*a*) in which chamber a filter material is arranged.

20. A filter cartridge according to claim 19, characterized in that the filter material in the chamber (60) is an active carbon fleece.

21. A filter cartridge (1) according to claim 1, characterized in that both the up-current chamber (3*a*) as well as the down-current chamber (2*a*) are provided with at least one filter means.

22. A filter cartridge (1) according to claim 21, characterized in that the up-current chamber (3*a*) is provided with a fluidized bed and the down-current chamber (2*a*) with a packed bed.

* * * * *